(12) United States Patent
Katz et al.

(10) Patent No.: US 11,811,637 B1
(45) Date of Patent: Nov. 7, 2023

(54) PACKET TIMESTAMP FORMAT MANIPULATION

(71) Applicant: Amazon Technologies, Inc., Seattle, WA (US)

(72) Inventors: Noam Katz, Tel Aviv-Jaffa (IL); Amiram Lifshitz, Kfar Hess (IL); Said Bshara, Tira (IL); Erez Izenberg, Tel Aviv-Jaffa (IL); Jonathan Chocron, Netanya (IL)

(73) Assignee: Amazon Technologies, Inc., Seattle, WA (US)

( * ) Notice: Subject to any disclaimer, the term of this patent is extended or adjusted under 35 U.S.C. 154(b) by 17 days.

(21) Appl. No.: 17/456,511

(22) Filed: Nov. 24, 2021

(51) Int. Cl.
*H04L 43/106* (2022.01)
*H04L 69/28* (2022.01)
*H04L 69/18* (2022.01)

(52) U.S. Cl.
CPC ............ *H04L 43/106* (2013.01); *H04L 69/18* (2013.01); *H04L 69/28* (2013.01)

(58) Field of Classification Search
CPC ........ H04L 43/106; H04L 69/18; H04L 69/28
See application file for complete search history.

(56) References Cited

U.S. PATENT DOCUMENTS

| | | | |
|---|---|---|---|
| 8,358,653 B1 * | 1/2013 | Attig | H04L 69/22 716/51 |
| 8,631,483 B2 * | 1/2014 | Soni | H04L 63/0263 726/13 |
| 8,837,473 B2 * | 9/2014 | Binetti | H04L 69/28 370/389 |
| 9,306,693 B2 * | 4/2016 | Tzeng | H04J 3/0661 |
| 9,667,370 B2 * | 5/2017 | Tzeng | H04L 12/56 |
| 10,650,452 B2 * | 5/2020 | Parsons | G06Q 40/04 |
| 11,146,485 B1 * | 10/2021 | Stein | H04L 45/302 |
| 11,562,228 B2 * | 1/2023 | Ganapavarapu | G06N 7/08 |
| 2003/0135612 A1 * | 7/2003 | Huntington | H04L 69/164 709/224 |
| 2003/0219007 A1 * | 11/2003 | Barrack | H04L 65/65 370/352 |
| 2004/0158640 A1 * | 8/2004 | Philbrick | H04L 69/163 709/250 |
| 2005/0036512 A1 * | 2/2005 | Loukianov | H04J 3/0632 375/E7.278 |
| 2005/0165985 A1 * | 7/2005 | Vangal | G06F 13/4027 710/107 |
| 2006/0251084 A1 * | 11/2006 | Elliot | H04J 3/0673 370/398 |

(Continued)

OTHER PUBLICATIONS

U.S. Appl. No. 17/643,017, filed Dec. 7, 2021, Katz et al.

*Primary Examiner* — Jerry B Dennison
(74) *Attorney, Agent, or Firm* — Weaver Austin Villeneuve & Sampson LLP

(57) ABSTRACT

To support different timestamp formats, for example, for different network protocols, an integrated circuit device is provided with a memory that is programmed with multiple instruction sets associated with multiple timestamp formats. Each of the instruction sets contains instructions to generate a timestamp according to a corresponding timestamp format. A compute circuit can generate a formatted timestamp by using a base timestamp input and executing an instruction set selected from the multiple instruction sets stored in the memory.

22 Claims, 9 Drawing Sheets

(56) References Cited

U.S. PATENT DOCUMENTS

| | | | |
|---|---|---|---|
| 2010/0135325 A1* | 6/2010 | Kim | H04L 65/65 |
| | | | 370/474 |
| 2012/0014377 A1* | 1/2012 | Joergensen | H04L 43/106 |
| | | | 370/352 |
| 2013/0089090 A1* | 4/2013 | Binetti | H04L 69/28 |
| | | | 370/389 |
| 2013/0205123 A1* | 8/2013 | Vorbach | G06F 9/30076 |
| | | | 712/221 |
| 2014/0177653 A1* | 6/2014 | Tzeng | H04J 3/0673 |
| | | | 370/503 |
| 2014/0226683 A1* | 8/2014 | Castiel | H04L 12/64 |
| | | | 370/474 |
| 2014/0293825 A1* | 10/2014 | Kalkunte | H04L 43/0852 |
| | | | 370/474 |
| 2016/0085479 A1* | 3/2016 | Edmiston | G06F 3/0683 |
| | | | 711/154 |
| 2019/0260568 A1* | 8/2019 | Pepper | H04L 7/0008 |
| 2020/0177660 A1* | 6/2020 | Connor | H04L 69/326 |
| 2022/0116373 A1* | 4/2022 | Soo | H04L 63/0428 |
| 2022/0284112 A1* | 9/2022 | Seader | G06F 21/57 |

* cited by examiner

US 11,811,637 B1

PACKET TIMESTAMP FORMAT MANIPULATION

BACKGROUND

Computing systems are often networked to allow devices to communicate with each other. Such computing systems may include host processing logic, a host memory, and a network device to send and receive packets. The network device can be in the form of a network interface card or component that is interconnected with the host processing logic via a communication bus. The host processing logic may provide data to the network device for transmission onto a network, and the network device may receive data from a network to provide to the host processing logic.

BRIEF DESCRIPTION OF THE DRAWINGS

Various embodiments in accordance with the present disclosure will be described with reference to the drawings, in which.

DETAILED DESCRIPTION

Network devices utilize timestamps for a variety of purposes. For example, timestamps can be used for event logging to indicate the time of occurrence of an event, for network latency measurements such as round trip delays, for clock synchronization between devices and components of a network, for generating time-dependent parameters such as a security token or cryptographic keys, for scheduling certain time-dependent actions or tasks, etc. A typical network device can support multiple network protocols, and different network protocols may utilize different timestamp formats. For example, the bit length, time resolution, and/or a starting reference time can vary for different timestamp formats. In order to support the different timestamp formats, software on the host system or on the network device can be used to generate the timestamp in the proper format. However, relying on software to generate the timestamp can cause inaccurate time information because of the software execution latency. Furthermore, the inaccuracy can be exacerbated if the computing resource to generate the timestamp is not currently available (e.g., a processor is busy executing other tasks), and wait cycles are inserted before the formatted timestamp can be generated.

To improve the accuracy of timestamps and provide the flexibility to support different timestamp formats, the techniques disclosed herein utilize a dedicate timestamp generation circuit. A memory can store different instruction sets corresponding to different timestamp formats. The timestamp generation circuit includes a compute circuit that receives a base timestamp, and generates a formatted timestamp according to an instruction set selected from the instruction sets stored in the memory. The instruction set can be selected, for example, based on the network protocol of the packet being processed. The dedicated timestamp generation circuit provides more accurate timestamps because the timestamps are generated in hardware with low latency. Furthermore, because the compute circuit is not shared with other tasks, timestamps can be generated on demand without have to wait for availability of the compute circuit. Moreover, as new protocols are developed, the memory can be updated with new instruction sets to support new timestamp formats for new protocols.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
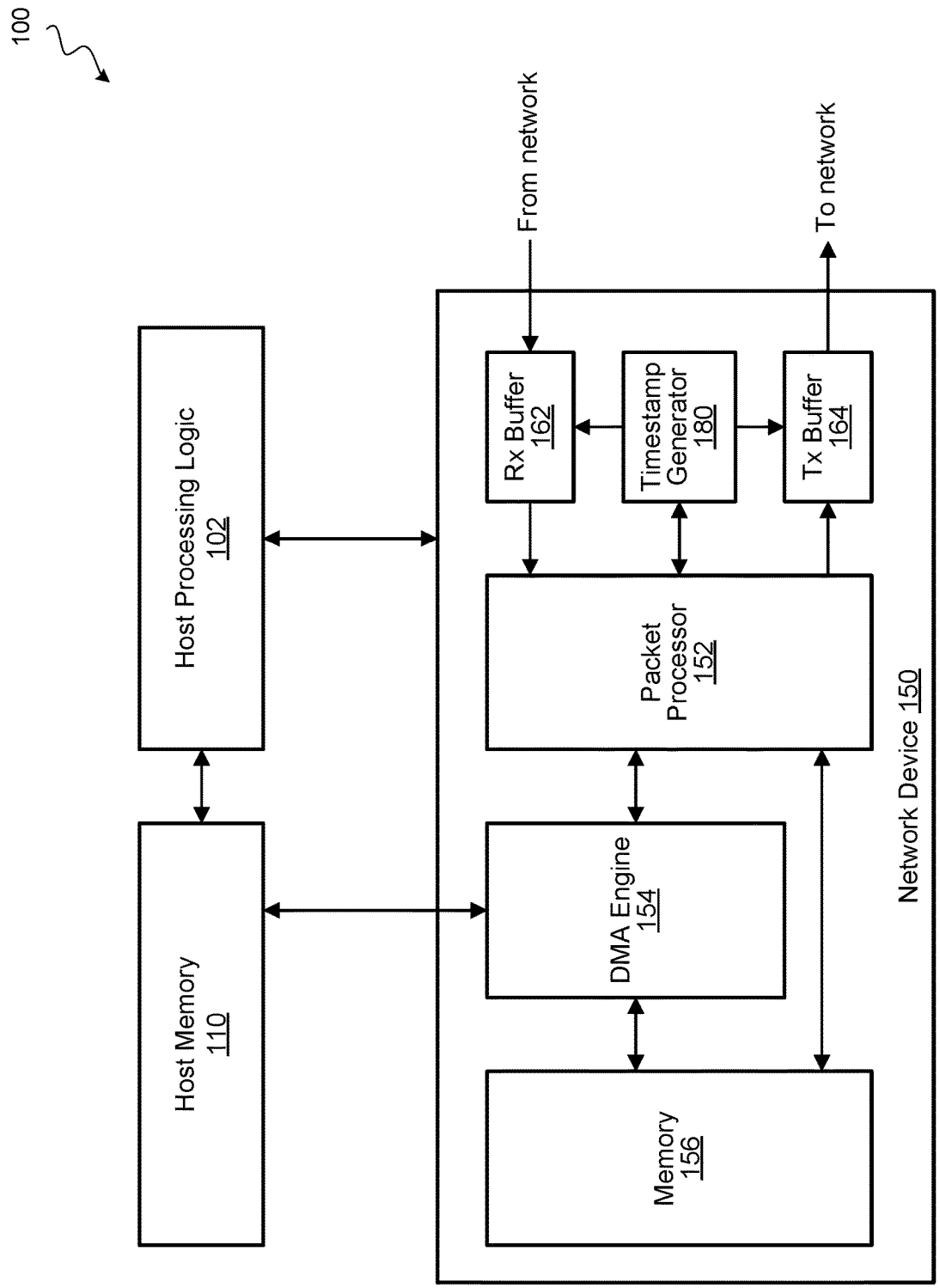
FIG. 1 illustrates a block diagram of an example of a computing system, according to certain aspects of the disclosure.

FIG. 1 illustrates a simplified block diagram of an example of a computing system 100. Computing system 100 may include host processing logic 102, a host memory 110, and a network device 150. Computing system 100 may include additional components not specifically shown. Host processing logic 102 may include one or more processors. The one or more processors can be general-purpose processors or other types of processors capable of executing software code such as an operating system and/or various software applications. A processor may also include multiple processing cores to provide multiple execution threads. Host memory 110 may provide temporary or long-term storage for data accessed by host processing logic 110. The host memory 110 may include dynamic random access memory (DRAM), synchronous DRAM (SDRAM), and/or double data rate (DDR), among others. In some cases, host memory 110 may also include read-only memory (ROM), such as programmable read-only memory (PROM), erasable programmable read-only memory (EPROM), electrically erasable programmable read-only memory (EEPROM), and/or flash memory, among others.

Host processing logic 102 and host memory 110 can be coupled to a network device 150 via a communication bus (not shown). The communication bus can be implemented, for example, using a standardized bus protocol such as one or more variations of the Peripheral Component Interconnect (PCI) standard bus protocols. The PCI family of protocols may include the original PCI standard, PCI-eXtended (PCI-X), Accelerated Graphics Port (AGP), and PCI Express (PCIe, also referred to as PCI-XP), etc. The term "PCI" or "PCI-based" may be used herein to describe any protocol in the PCI family of bus protocols. Other bus protocols that can be used may include, for example, Industry Standard Architecture (ISA), Extended ISA (EISA), Video Electronics Standards Association (VESA), Micro Channel, and any of the Advanced Technology Attachment (ATA) family of protocols, among others. The communication between network device 150 and the host components can also be implemented with a combination of standard bus protocols, a combination of proprietary bus protocols, and/or a combination of standard and proprietary bus protocols.

Network device 150 can be, for example, a network interface card (NIC), and may include a packet processor 152, a receive buffer 162, a transmit buffer 164, a memory 156, and a DMA engine 154. In some implementations, network device 150 may omit one or more components, and/or may include one or more components not specifically shown. Packet processor 152 can be implemented using, for example, one or more processors, one or more field programmable gate arrays (FPGAs), one or more suitable application specific integrated circuits (ASICs), or a combination thereof. Packet processor 152 can be configurable to process network packets according to multiple network protocols. The multiple network protocols supported by packet processor 152 may include different protocols at the same protocol layer (e.g., different L2 protocols, different L3 protocols, different transport layer protocols, etc.), and/or protocols at different network layers (e.g., to generated nested protocol packets).

Packet processor 152 may generate packets for transmission to a network via transmit buffer 164. For example, packet processor 152 may generate a network packet by obtaining data from host memory 110, generating a packet header (e.g., by populating fields in a packet header), and concatenating the packet header with the data as the payload into a network packet according to the protocol of the network that the network packet is being transmitted on. Depending on the protocol, the packet header may include fields such as a source address, a destination address, packet length, sequence number, and/or other information utilized by the network to route and process packets. In some implementations, packet processor 152 may also generate error checking information such as a frame check sequence or a cyclic redundancy check code that is inserted into the header or appended to the data payload. Packet processor 152 may also set control fields or control bits, for example, to indicate start and end of the network packet.

Packet processor 152 may also process network packets received from a network via receive buffer 162, and provide the data payload to host memory 110 for host processing logic 102. For example, packet processor 152 may process a received network packet from the network by parsing and extracting the header fields, and performing error checks on the network packet such as verifying the sequence number and error checking information. Packet processor 152 may then remove the header and other information not needed by the host processing logic 102 from the received network packet and write the data payload to host memory 110.

In some implementations, a DMA engine 154 can be used to read and write data directly with host memory 110 while bypassing host processing logic 102. DMA engine may maintain one or more memory descriptor queues, and perform the data movement indicated in each memory descriptor. This can improve throughput and reduce latency because the data movement between the host components and network device 150 can be offloaded to the DMA engine 154.

Memory 156 can be used to store instructions to be executed by network device 150 and data being processed by network device 150. For example, memory 156 may temporarily store data obtained from host memory 110 being formed into network packets for transmission, and/or temporarily store data extracted from received network packets for placement into host memory 110. In some implementations, memory can also be used to implement the descriptor queues used by DMA engine 154.

Network device 150 also includes a timestamp generator 180. Timestamp generator 180 may include a dedicated timestamp generation circuit to generate a formatted timestamp from a base timestamp. Depending on the protocol of the network communicating with network device 150, the formatted timestamp can be inserted into a network packet being transmitted from network device 150. For example, the formatted timestamp can be inserted into the header of the network packet being transmitted. Timestamp generator 180 may also generate a formatted timestamp in response to network device 150 receiving a network packet. The formatted timestamp can be provided to packet processor 152 and/or host processing logic 102 to tag the received network packet with the formatted timestamp to indicate a time-of-arrival of the received network packet. In some implementations, timestamp generator 180 may also generate a formatted timestamp to log events in network device 150 or host processing logic 102 such as reception of erroneous or out-of-sequence packets, buffer overflows, or other events of interest.

Figure 2:
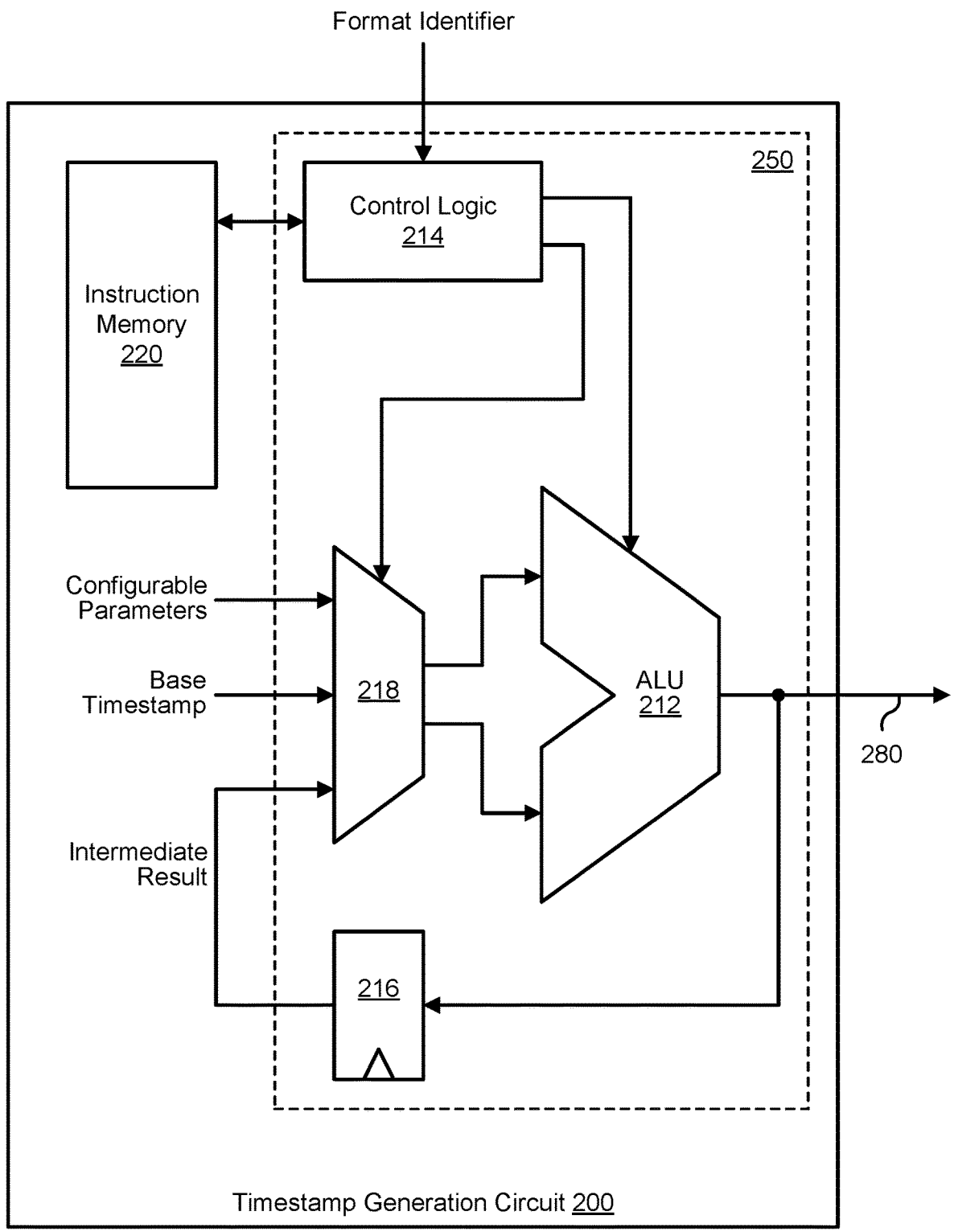
FIG. 2 illustrates a block diagram of an example of a timestamp generation circuit, according to certain aspects of the disclosure.

FIG. 2 illustrates a block diagram of an example of a timestamp generation circuit 200 that can be used to implement a timestamp generator (e.g., timestamp generator 180). Timestamp generation circuit 200 includes an instruction memory 220 and a timestamp compute circuit 250. Instruction memory 220 can be an internal memory of timestamp generation circuit 200 as shown. In some implementations, instruction memory 220 can be implemented as part of the memory of the network device such as memory 156. Instruction memory 220 may include volatile memory and/or non-volatile memory. Instruction memory 220 is programmed with multiple instruction sets associated with multiple timestamp formats, respectively. Each of the instruction sets contains a list of instructions to generate a timestamp according to a corresponding timestamp format. The timestamp formats can include timestamp formats for different network protocols supported by the network device. The timestamp formats may include timestamp formats having different bit lengths and/or different time resolutions. In some implementations, different timestamp formats may include timestamp formats with the same bit length but different resolution, and/or timestamp formats with the same resolution but different bit lengths.

Timestamp compute circuit 250 is operable to generate a formatted timestamp output 280 from a base timestamp input by executing an instruction set selected from the instruction sets stored in instruction memory 220. For example, the instruction set can be selected according to a network protocol of a network packet being processed by the packet processor of the network device. In some implementations, the base timestamp can be provided to timestamp compute circuit 250 from the host processing logic or from the packet processor. In some implementations, the base timestamp may originate from a network. For example, at boot of the network device or other triggering events, or periodically or at some time interval, the network may provide the network device with a network time, and the packet processor or the host processing logic may convert the network time to an initial base timestamp. Thereafter, the packet processor may maintain time by incrementing the base timestamp. In some implementations, the base timestamp can be in a binary format, and may include a set of second bits and a set of sub-second bits. For example, the base timestamp may include 32 bits to represent seconds, and 50 bits to represent sub-seconds. In other implementations, different number of seconds bits and/or sub-seconds bits can be used.

Timestamp compute circuit 250 includes an arithmetic logic unit (ALU) 212 and an operand selector circuit 218 operable to select operands for ALU 212. Operand selector circuit 218 can be implemented, for example, using a multiplexer. The operands for ALU 212 can be selected from one or more configurable parameters, a base timestamp input, and an intermediate result generated by ALU 212. Timestamp compute circuit 250 may include a set of registers (not shown) to store at least some of the configurable parameters. The configurable parameters may include constant values, bit masks, and/or stored intermediate results from previous compute cycles. In some implementations, at least some of the values of the configurable parameters can be predetermined and be preloaded into the registers. At least some of the values of the configurable parameters can be determined based on the instruction set being executed. For example, the value of a configurable parameter can be set based on a value provided in the instruction being executed.

ALU 212 can be configurable to perform various arithmetic and/or logical operations based on an instruction being executed. For example, ALU 212 can be configurable to perform an operation selected from a set of operations including addition, subtraction, multiplication, division, bitwise inversion, bitwise AND, bitwise OR, bitwise XOR, minimum, maximum, shift-left by a configurable number of one or more bits, shift-right by a configurable number of one or more bits, and/or masking a configurable number of one or more bits. In some scenarios, the formatted timestamp may utilize more than one computation/instruction to generate. The result of one computation can be fed back to ALU 212 to perform further computations. In such scenarios, the output of ALU 211 is sampled by a multi-bit flip-flop 216, and output of the multi-bit flip-flop 216 is provided as the intermediate result input to operand selector circuit 218 for the next computation/instruction. In some implementations, each of the intermediate results computed at each cycle of an instruction set is stored, and any of the intermediate results computed in prior cycles of an instruction set can be selected as an input for the next computation/instruction.

Timestamp compute circuit 250 also includes control logic 214 to control the operation of timestamp compute circuit 250. Control logic 214 may receive a format identifier (e.g., from the packet processor) indicating a timestamp format of a timestamp to generate. Control logic 214 may select an instruction set from instruction memory 220 corresponding to the received format identifier. Control logic 214 may then execute each instruction from the selected instruction set by configuring operand selector circuit 218 to select the proper operands for ALU 212, and by configuring ALU 212 to perform an arithmetic or logical operation according to the instruction being executed. The formatted timestamp is provided as output 280 upon executing all the instructions in the selected instruction set.

Figure 3:
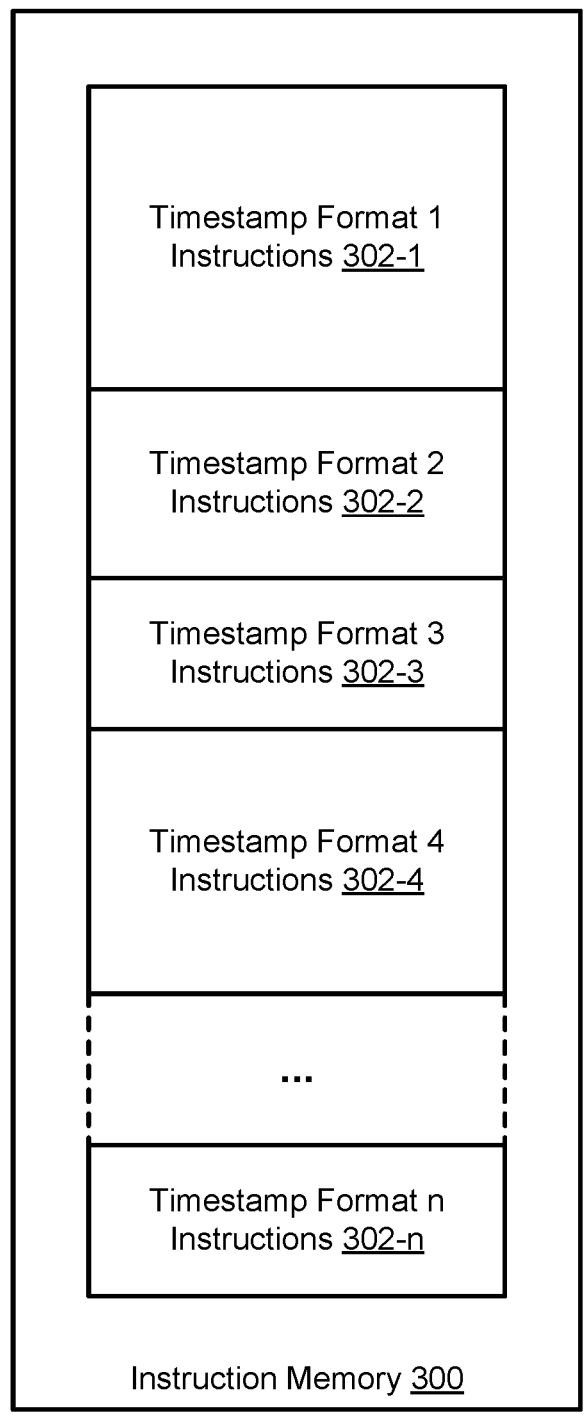
FIG. 3 illustrates a conceptual diagram of an example of a memory, according to certain aspects of the disclosure.

FIG. 3 illustrates a conceptual diagram of an example of the contents of an instruction memory 300 utilized by a timestamp generator. Instruction memory 300 can be implemented using volatile memory and/or non-volatile memory. In some implementations, instruction memory 300 can be implementations using a portion (e.g., a partition) of the memory of the network device. Instruction memory 300 may store multiple instruction sets 302-1 to 302-n. For example, instruction memory 300 may store at least 4, 8, 16, or more instruction sets. Each of instruction sets 302-1 to 302-n may correspond to a timestamp format. In some implementations, each timestamp format may correspond to a network protocol. By way of example, instruction memory 300 may store instructions sets for one or more of a network time protocol (NTP) format (e.g., 32-bit NTP format, 64-bit NTP format, and/or 128-bit NTP format, etc.), a transmission control protocol (TCP) format (e.g., 32-bit format), a precision time protocol (PTP) format (e.g., 80-bit format with 48 bits for seconds and 32 bits for nanoseconds, truncated 64-bit format with 32 bits for seconds and 32 bits for nanoseconds, etc.), and/or a real-time transport protocol (RTP) format (e.g., 64-bit format, etc.). Other formats for networking protocols that can be supported may include a multiprotocol label switching (MPLS) format, transparent interconnection of lots of links (TRILL) format, Internet protocol flow information export (IPFIX) format, and/or any proprietary timestamp formats. As shown in FIG. 3, depending on the timestamp format, the number of instructions in the corresponding instruction set can vary. In other words, some instruction sets may include more instructions than others, and some instruction sets may include fewer instructions than others.

In some implementations, a format identifier associated with each timestamp format can be stored with the corresponding instruction set in instruction memory 300. The format identifier stored in instruction memory 300 with the instruction set can be used, for example, as an index to retrieve the proper instruction set for the particular timestamp format. In some implementations, the number of instructions or length in each instruction set can also be stored with the format identifier in instruction memory 300. The length of the instruction set can be used by the control logic of the timestamp generator to determine the number of instructions to execute to generate the formatted timestamp. In other implementations, the instruction sets can be addressed mapped, and a mapping table can be used to map format identifiers to addresses (e.g., a starting address) in instruction memory 300 storing the instructions for the corresponding format identifier. The format identifier received by the control logic can be used to look up the starting address for the instruction set from the mapping table, and the control logic may use the starting address to retrieve the instruction set for the corresponding timestamp format.

Figure 4:
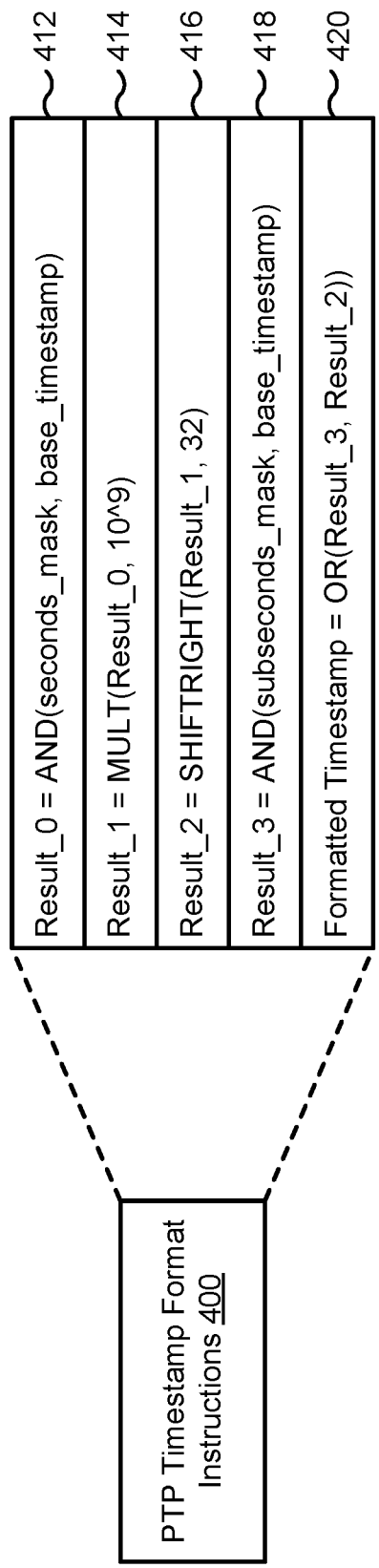
FIG. 4 illustrates a conceptual diagram of an example of an instruction set, according to certain aspects of the disclosure.

FIG. 4 illustrates a conceptual diagram of an example of the contents of an instruction set 400. Instruction set 400 can be, for example, any one of instruction sets 302-1 to 302-n shown in FIG. 3. In the example shown, instruction set 400 may correspond to a timestamp format for the 80-bit precision time protocol (PTP) format with 48 bits for seconds and 32 bits for nanoseconds. The base timestamp format used in this example may include 32 bits to represent seconds, and 50 bits to represent sub-seconds.

Instruction set 400 may include five instructions 412 to 420 to generate the PTP timestamp format from a base timestamp input. The first instruction 412 may include performing an AND operation on a seconds mask and the base timestamp input to obtain the sub-second portion of the base timestamp. The seconds mask may correspond to one of the configurable parameter inputs to the ALU. The second instruction 414 may include performing a MULTIPLY operation on the result of the first instruction (Result_0) and $10^9$ to obtain the nanosecond resolution for the PTP timestamp format. The $10^9$ value may correspond to one of the configurable parameter inputs to the ALU. The third instruction 416 may include performing a SHIFT RIGHT operation on the result of the second instruction (Result_1) by 32-bits to obtain 32-bits of nanoseconds. The 32 value (number of bits to shift) may correspond to one of the configurable parameter inputs to the ALU. The result of third instruction (Result 2) can be stored in one of the configurable parameter registers for subsequent processing. The fourth instruction 418 may include performing an AND operation on a sub-seconds mask and the base timestamp to obtain the seconds from the base timestamp. The sub-seconds mask may correspond to one of the configurable parameter inputs to the ALU. The fifth instruction 420 may include performing an OR operation on the result from the fourth instruction (Result 3) and the result from the third instruction (Result 2) to obtain the formatted timestamp. The result of the OR operation can be provided as the PTP formatted timestamp.

Figure 5:
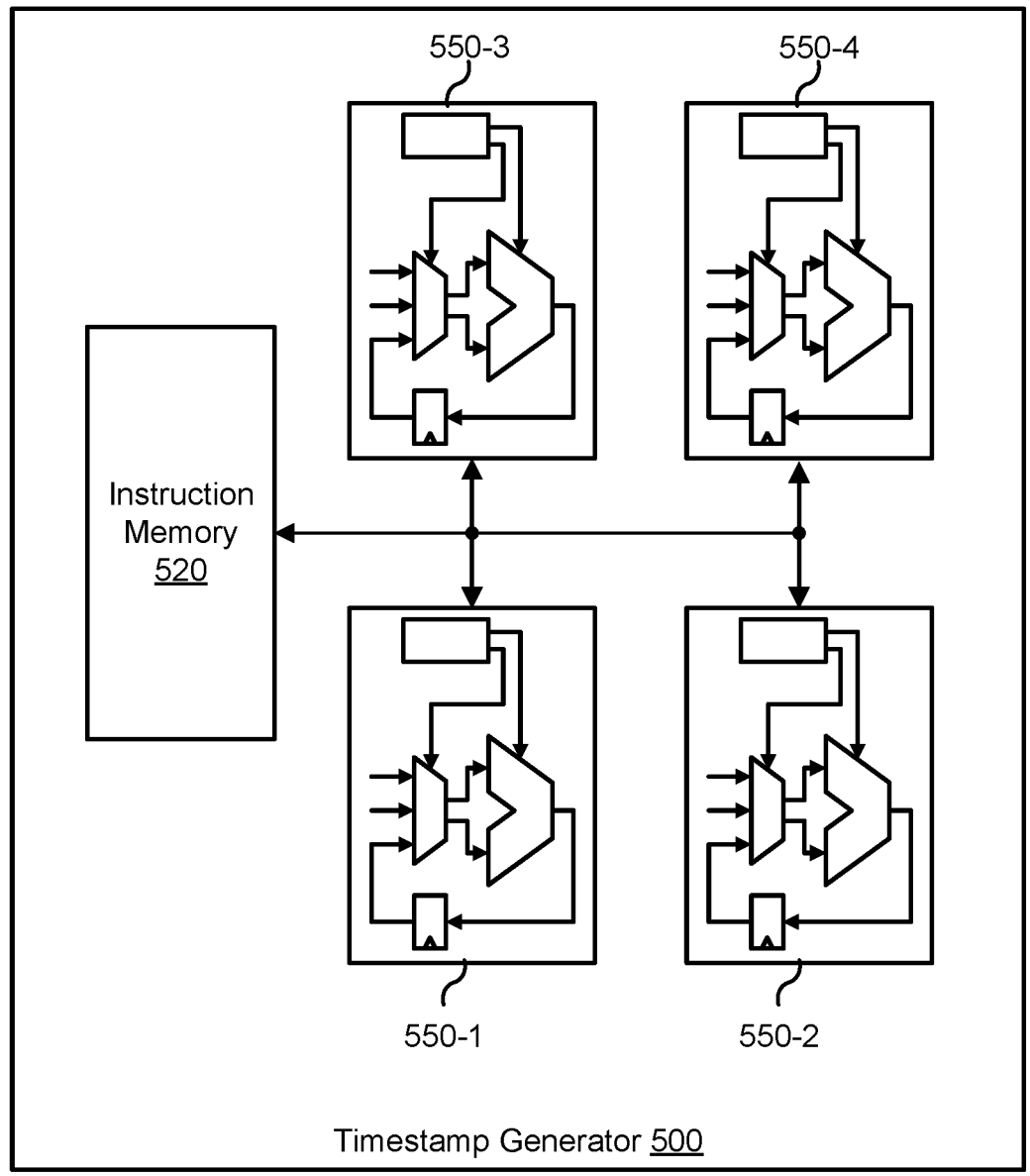
FIG. 5 illustrates a block diagram of an example of a timestamp generator, according to certain aspects of the disclosure.

FIG. 5 illustrates a block diagram of another example of a timestamp generator 500. Timestamp generator 500 includes four timestamp compute circuits 550-1 to 550-4. Each of the timestamp compute circuits can be implemented, for example, using the timestamp compute circuit 250 of FIG. 2. Although four timestamp compute circuits are shown, other implementations can include a different number of timestamp compute circuits. By including multiple timestamp compute circuits, multiple formatted timestamps can be generated in parallel.

Timestamp generator 500 may utilize multiple timestamp compute circuits 550-1 to 550-4 to ensure that the timestamp generation can keep up with the packet rate. By way of example, certain timestamp formats may take up to 16 clock cycles (e.g., 16 instructions) to generate. If the packet rate is greater than one packet per 16 clock cycles, a single timestamp compute circuit may be unable to generate a timestamp for each network packet in time to keep up with the packet rate. In such scenarios, the multiple timestamp compute circuits 550-1 to 550-4 can operate in a pipeline manner to support at least four packets per 16 clock cycles.

In some scenarios, the multiple timestamp compute circuits 550-1 to 550-4 may each be generating timestamps in the same timestamp format (e.g., for a burst of packets of the same network protocol). Hence, the multiple timestamp compute circuits 550-1 to 550-4 may each be executing the same instruction set, and the same instruction memory 520 can be shared between the multiple timestamp compute circuits 550-1 to 550-4 as shown in FIG. 5. Such an implementation can be used to reduce the physical area of the timestamp generator 500 by reducing the memory footprint. It should be noted that although the instruction memory 520 is being shared amongst the multiple timestamp compute circuits 550-1 to 550-4, instruction memory 520 may still have the capacity to store four or more instructions sets such that each timestamp compute circuit may execute a different instruction set to generate timestamps in different formats.

Figure 6:
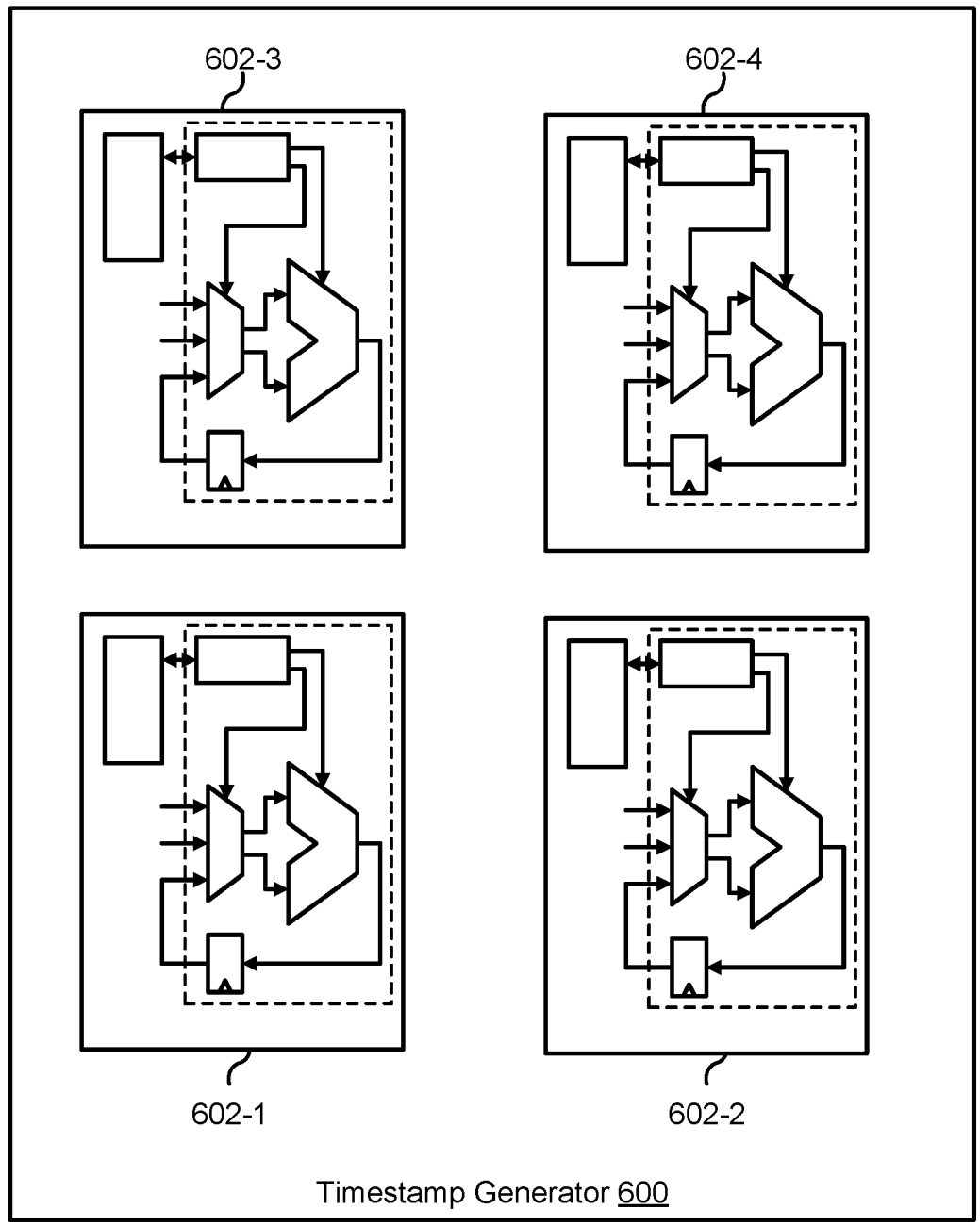
FIG. 6 illustrates a block diagram of another example of a timestamp generator, according to certain aspects of the disclosure.

FIG. 6 illustrates a block diagram of a further example of a timestamp generator 600. Timestamp generator 600 includes four timestamp generation circuits 602-1 to 602-4. Each of the timestamp generation circuits can be implemented, for example, using the timestamp generation circuit 200 of FIG. 2. Although four timestamp generation circuits are shown, other implementations can include a different number of timestamp generation circuits. Similar to timestamp generator 500, the multiple timestamp generation circuits 602-1 to 602-4 can be used to increase the throughput of the timestamp generation to keep up with the packet rate. In contrast to timestamp generator 500, each timestamp generation circuits 602-1 to 602-4 has its own instruction memory.

In some implementations, one or more of the instruction memories can be programmed with different instruction sets that the other memories. Such implementations can increase the number of supported timestamp formats without having to reprogram the instruction memory. By way of example, two instruction memories can be programmed with a group of instruction sets, and the other two instruction memories can be programmed with a different group of instruction sets. The two groups of instruction sets may correspond to network protocols of different layers, and timing generator 600 can be used to generate multiple timestamps in different formats for a nested network protocol packet.

Figure 7:
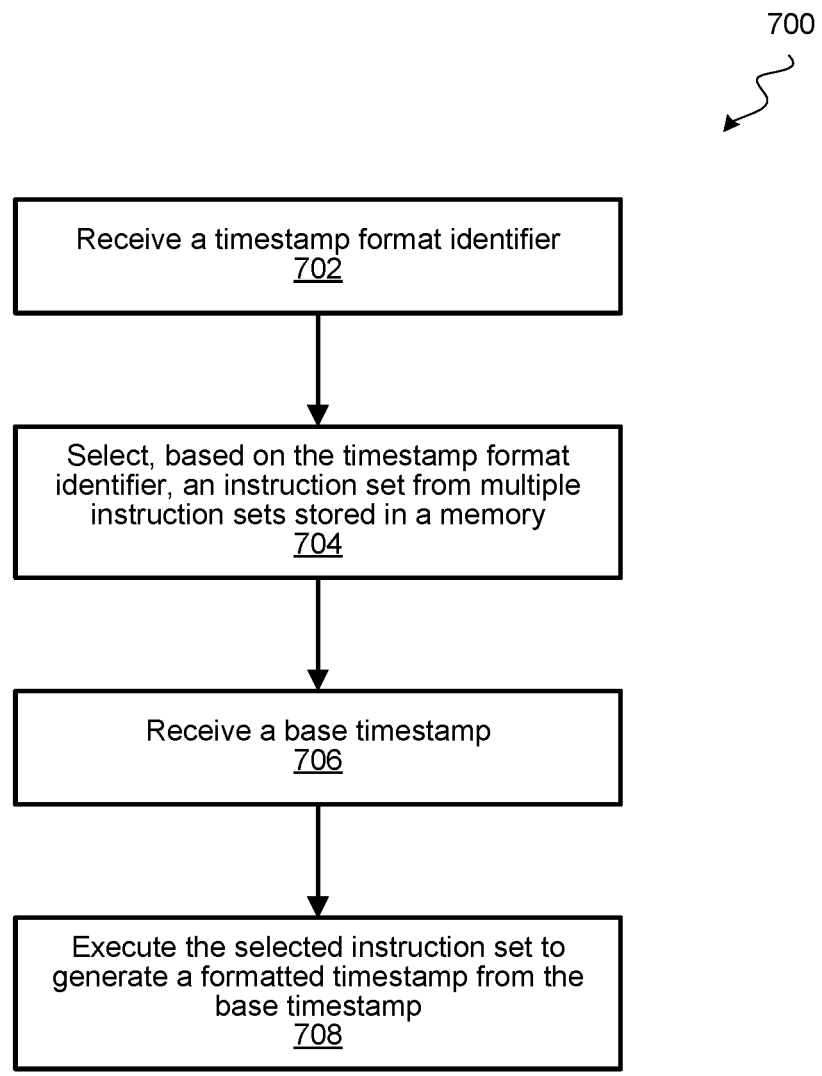
FIG. 7 illustrates a flow diagram of an example of a timestamp generation process, according to certain aspects of the disclosure.

FIG. 7 illustrates a flow diagram of an example of a process 700 for generating a formatted timestamp. Process 700 can be performed, for example, by an integrated circuit device such as a timestamp generator of a network device. Process 700 can be performed to generate a formatted timestamp that is inserted into a network protocol packet for transmission from the integrated circuit device. Process 700 can also be performed in response to receiving a network protocol packet, for example, to tag the receive packet with a time-of-reception or time-of-arrival.

Process 700 may begin at block 702 by receiving a timestamp format identifier. In some implementations, the timestamp format identifier can be a network protocol identifier, or a value mapped to a network protocol identifier. The timestamp format identifier can be provided to the integrated circuit device, for example, by a packet processor to indicate the network protocol of the packet being processed by the packet processor.

At block 704, an instruction set is selected from multiple instruction sets stored in a memory based on the timestamp format identifier. For example, the timestamp format identifier can be used as an index to retrieve the instruction set from the memory. The timestamp format identifier can also be used to lookup a memory address associated with the timestamp format identifier from a mapping table that points to the starting address of the instruction set in the memory. The multiple instruction sets stored in the memory can be associated with multiple timestamp formats, respectively, and each timestamp format may correspond to a network protocol. The different timestamp formats may include, for example, formats with different bit lengths and/or time resolution (e.g., the smallest unit of time indicated by the timestamp).

At block 706, a base timestamp is received. The base timestamp may include a first set of bits to represent seconds, and a second set of bits to represent sub-seconds time. In some implementations, the base timestamp can be maintained by a packet processor (e.g., using a counter), and be provided to the timestamp generator. The initial value of the base timestamp can be provided to the packet processor from the network or from the host processing logic.

At block 708, the instruction set selected at block 704 is executed on a compute circuit to generate a formatted timestamp from the base timestamp. The formatted timestamp is generated in accordance with the format associated with timestamp format identifier received at block 702. The formatted timestamp can then be inserted into a network protocol packet for transmission, or be provided to the packet processor or host processing logic to log the time a packet is received. The formatted timestamp can also be used for other suitable purposes.

At another point in time, the network device may process network protocol packets that use a different timestamp format. As such, another timestamp format identifier can be received, and another instruction set from the instruction sets stored in the memory is selected to generate a different formatted timestamp. In some implementations, the memory can be reprogrammed to store a different instruction set to update the supported network protocols with a different or new network protocol.

Figure 8:
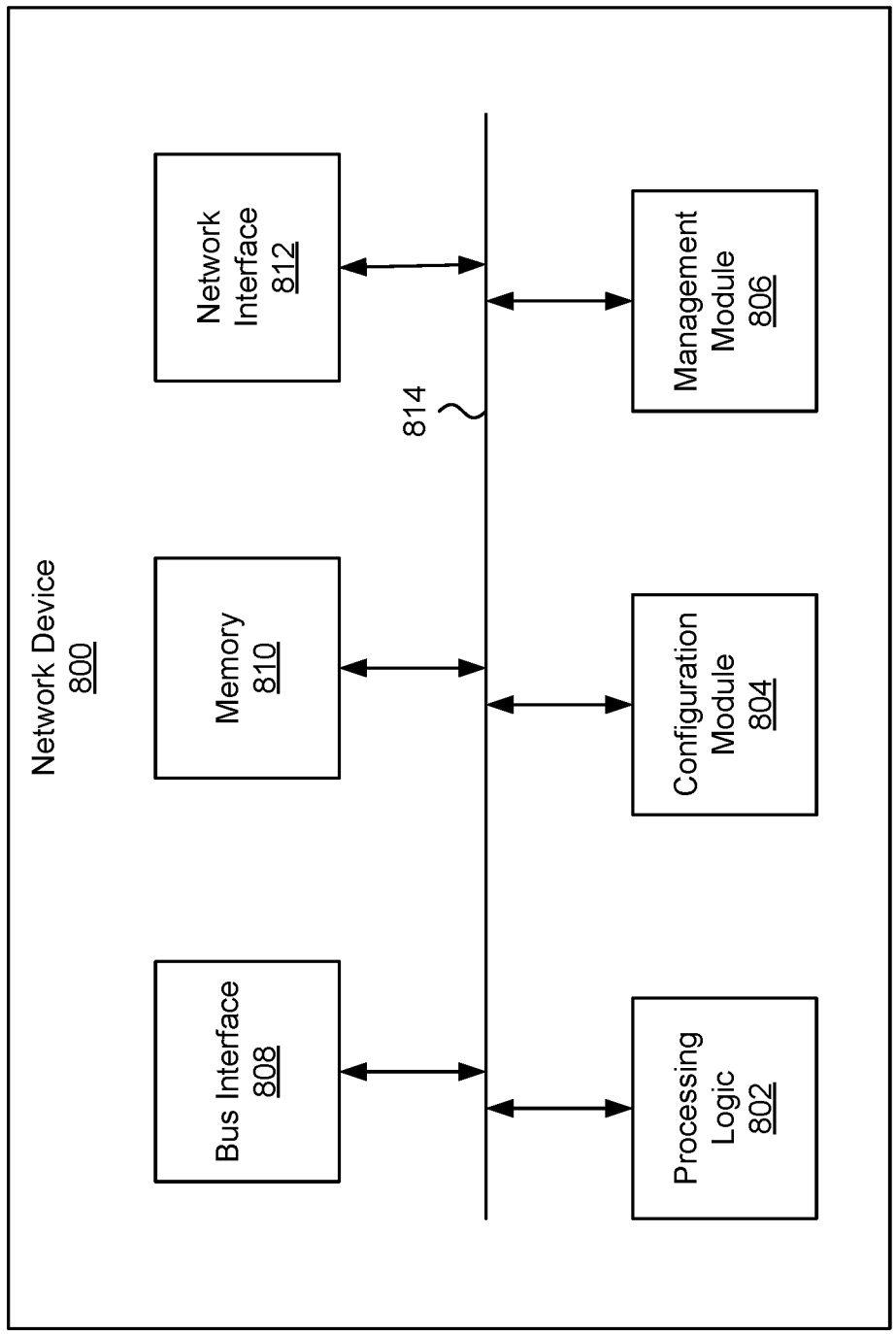
FIG. 8 illustrates an example of a network device, according to certain aspects of the disclosure.

FIG. 8 illustrates another example of a network device 800. Functionality and/or several components of the network device 800 may be used without limitation with other embodiments disclosed elsewhere in this disclosure. For example, some of the components of network device 800 may correspond to components of network device 150, and/or some of the components of network device 800 can be integrated with network device 150. A network device 800 may facilitate processing of packets and/or forwarding of packets from the network device 800 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 800 may be the recipient and/or generator of packets. In some implementations, the network device 800 may modify the contents of the packet before forwarding the packet to another device. The network device 800 may be a peripheral device coupled to another computer device, a switch, a router or any other suitable device enabled for receiving and forwarding packets.

In one example, the network device 800 may include processing logic 802, a configuration module 804, a management module 806, a bus interface module 808, memory 810, and a network interface module 812. These modules may be hardware modules, software modules, or a combination of hardware and software. In certain instances, modules may be interchangeably used with components or engines, without deviating from the scope of the disclosure. The network device 800 may include additional modules, not illustrated here, such as components discussed with respect to the nodes disclosed in FIG. 9. In some implementations, the network device 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 802 may include processors developed by ARM®, MIPS®, AMID®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810.

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the network device 800, while in other cases some or all of the memory may be external to the network device 800. The memory 810 may store an operating system comprising executable instructions that, when executed by the processing logic 802, provides the execution environment for executing instructions providing networking functionality for the network device 800. The memory may also store and maintain several data structures and routing tables for facilitating the functionality of the network device 800.

In some implementations, the configuration module 804 may include one or more configuration registers. Configuration registers may control the operations of the network device 800. In some implementations, one or more bits in the configuration register can represent certain capabilities of the network device 800. Configuration registers may be programmed by instructions executing in the processing logic 802, and/or by an external entity, such as a host device, an operating system executing on a host device, and/or a remote device. The configuration module 804 may further include hardware and/or software that control the operations of the network device 800.

In some implementations, the management module 806 may be configured to manage different components of the network device 800. In some cases, the management module 806 may configure one or more bits in one or more configuration registers at power up, to enable or disable certain capabilities of the network device 800. In certain implementations, the management module 806 may use processing resources from the processing logic 802. In other implementations, the management module 806 may have processing logic similar to the processing logic 802, but segmented away or implemented on a different power plane than the processing logic 802.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the network device 800 may include multiple bus interface modules for communicating with multiple external entities. These multiple bus interface modules may implement the same local bus protocol, different local bus protocols, or a combination of the same and different bus protocols.

The network interface module 812 may include hardware and/or software for communicating with a network. This network interface module 812 may, for example, include physical connectors or physical ports for wired connection to a network, and/or antennas for wireless communication to a network. The network interface module 812 may further include hardware and/or software configured to implement a network protocol stack. The network interface module 812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 800 may include multiple network interface modules, each configured to communicate with a different network. For example, in these implementations, the network device 800 may include a network interface module for communicating with a wired Ethernet network, a wireless 802.11 network, a cellular network, an Infiniband network, etc.

The various components and modules of the network device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 9.

Figure 9:
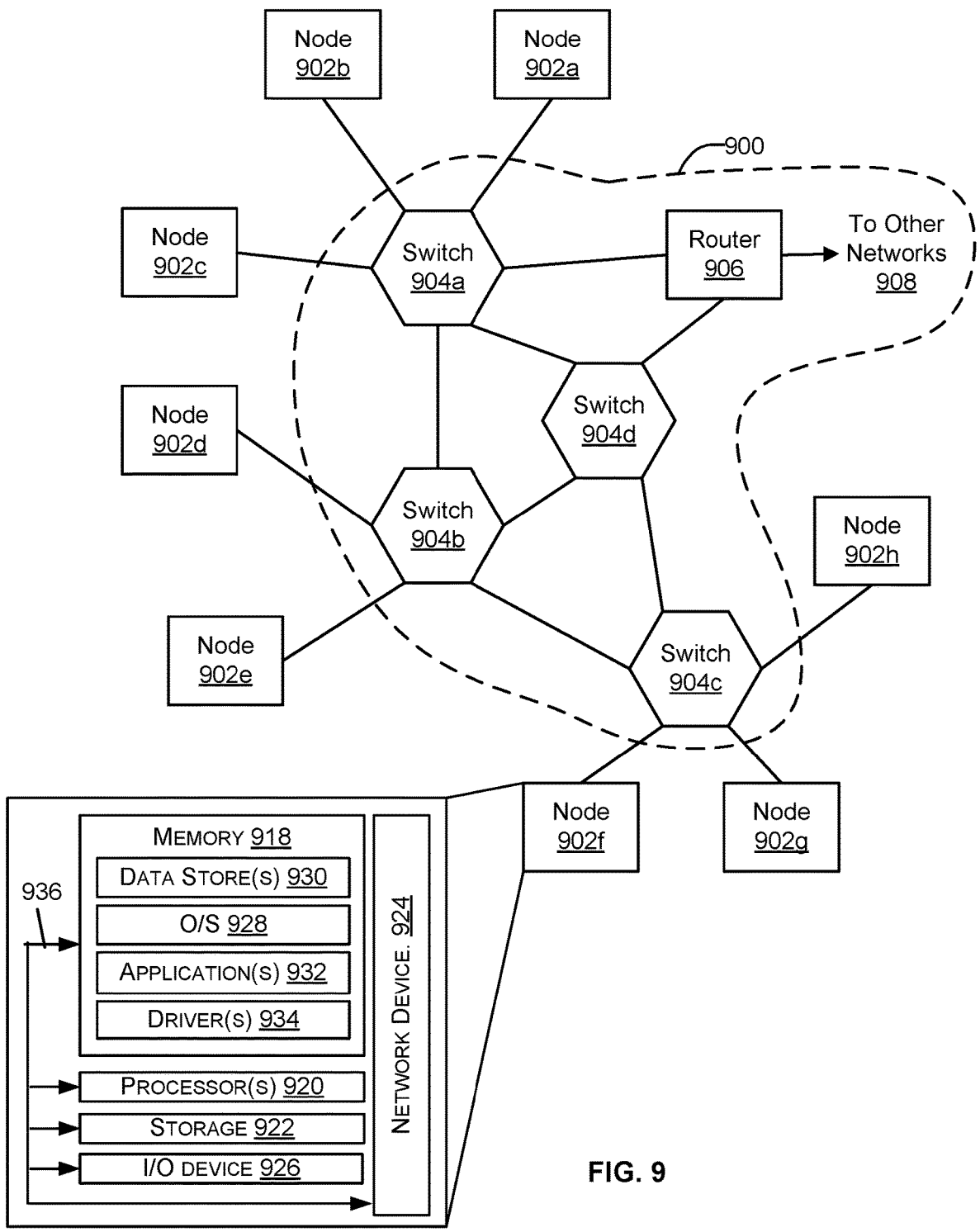
FIG. 9 illustrates an example architecture for features and systems described herein that includes one or more service provider computers and/or a user device connected via one or more networks, according to certain aspects of the disclosure.

FIG. 9 illustrates a network 900, illustrating various different types of network devices 800 of FIG. 8, such as nodes comprising the network device, switches and routers. In certain embodiments, the network 900 may be based on a switched architecture with point-to-point links. As illustrated in FIG. 9, the network 900 includes a plurality of switches 904a-904d, which may be arranged in a network. In some cases, the switches are arranged in a multi-layered network, such as a Clos network. A network device 800 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 904a-904d may be connected to a plurality of nodes 902a-902h and provide multiple paths between any two nodes.

The network 900 may also include one or more network devices 800 for connection with other networks 908, such as other subnets, LANs, wide area networks (WANs), or the Internet, and may be referred to as routers 906. Routers use headers and forwarding tables to determine the best path for forwarding the packets, and use protocols such as internet control message protocol (ICMP) to communicate with each other and configure the best route between any two devices.

In some examples, network(s) 900 may include any one or a combination of many different types of networks, such as cable networks, the Internet, wireless networks, cellular networks and other private and/or public networks. Interconnected switches 904a-904d and router 906, if present, may be referred to as a switch fabric, a fabric, a network fabric, or simply a network. In the context of a computer network, terms "fabric" and "network" may be used interchangeably herein.

Nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices 904. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900. The network device(s) 924 of FIG. 9 may include similar components discussed with reference to the network device 800 of FIG. 8.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 808 may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A network device comprising:
 a packet processor operable to process network packets according to a plurality of network protocols;

a memory programmed with a plurality of instruction sets associated with a plurality of timestamp formats corresponding to the plurality of network protocols; and a timestamp generator including a plurality of timestamp compute circuits, each timestamp compute circuit including:

an arithmetic logic unit (ALU); and an operand selector circuit operable to select operands for the ALU from one or more configurable parameters, a base timestamp input, and one or more intermediate results, wherein each timestamp compute circuit is operable to execute an instruction set selected from the plurality of instruction sets stored in the memory to generate a formatted timestamp according to a network protocol of a network packet being processed by the packet processor, and wherein the plurality of timestamp compute circuits is operable to generate formatted timestamps in a pipelined manner to keep up a packet rate.

2. The network device of claim 1, wherein the packet processor is operable to insert the formatted timestamp into the network packet being transmitted from the network device.

3. The network device of claim 1, wherein the packet processor is operable to tag a received network packet with the formatted timestamp to indicate a time-of-arrival of the received network packet.

4. The network device of claim 1, wherein a first timestamp compute circuit of the plurality of timestamp compute circuits is operable to execute a different instruction set than a second timestamp compute circuit.

5. An integrated circuit device comprising:

a memory programmed with a plurality of instruction sets associated with a plurality of timestamp formats, respectively, each of the instruction sets containing instructions to generate a timestamp according to a corresponding timestamp format; and a plurality of compute circuits, each compute circuit having a base timestamp input and operable to generate a formatted timestamp by executing an instruction set selected from the plurality of instruction sets stored in the memory, wherein the plurality of compute circuits is operable to generate formatted timestamps in a pipelined manner.

6. The integrated circuit device of claim 5, wherein the plurality of timestamp formats includes timestamp formats for different network protocols.

7. The integrated circuit device of claim 5, wherein the plurality of timestamp formats includes timestamp formats having different bit lengths.

8. The integrated circuit device of claim 5, wherein the compute circuit includes an operand selector circuit and an arithmetic logic unit (ALU).

9. The integrated circuit device of claim 8, wherein the operand selector circuit is operable to select operands for the ALU from one or more configurable parameters, the base timestamp input, and one or more intermediate results.

10. The integrated circuit device of claim 8, wherein the ALU is configurable to perform an operation selected from a set of operations including addition, subtraction, multiplication, division, bitwise inversion, bitwise AND, bitwise OR, bitwise XOR, maximum, minimum, shift-left by a configurable number of one or more bits, shift-right by a configurable number of one or more bits, or masking a configurable number of one or more bits.

11. The integrated circuit device of claim 5, wherein the formatted timestamp is inserted into a network packet for transmission from the integrated circuit device.

12. The integrated circuit device of claim 5, wherein the formatted timestamp is used to indicate a time of reception of a network packet.

13. The integrated circuit device of claim 5, wherein the plurality of timestamp formats includes one or more timestamp formats for a network time protocol (NTP) format, a transmission control protocol (TCP) format, a precision time protocol (PTP) format, or a real-time transport protocol (RTP) format.

14. The integrated circuit device of claim 5, wherein a first compute circuit of the plurality of compute circuits is operable to execute a different instruction set than a second compute circuit.

15. A method comprising:

receiving, by an integrated circuit device, a timestamp format identifier;

selecting, by the integrated circuit device based on the timestamp format identifier, an instruction set from a plurality of instruction sets stored in a memory of the integrated circuit device, the plurality of instruction sets associated with a plurality of timestamp formats, respectively;

receiving, by the integrated circuit device, a base timestamp; and executing, by the integrated circuit device, the selected instruction set on a timestamp compute circuit to generate a formatted timestamp from the base timestamp, the formatted timestamp corresponding to the timestamp format identifier, wherein the timestamp compute circuit is one of a plurality of timestamp compute circuits operable to generate formatted timestamps in a pipelined manner.

16. The method of claim 15, wherein the plurality of timestamp formats includes timestamp formats for a corresponding plurality of network protocols.

17. The method of claim 16, further comprising:

reprogramming the memory to store a different instruction set to update the plurality of network protocols with a different network protocol.

18. The method of claim 16, wherein the plurality of timestamp formats includes timestamp formats having different resolutions.

19. The method of claim 15, further comprising:

inserting the formatted timestamp into a network protocol packet for transmission from the integrated circuit device.

20. The method of claim 15, wherein the formatted timestamp is generated in response to receiving a network protocol packet.

21. The method of claim 15, further comprising:

receiving another timestamp format identifier; and selecting another instruction set from the plurality of instruction sets stored in the memory of the integrated circuit device to generate a different formatted timestamp.

22. The method of claim 15, wherein a first timestamp compute circuit of the plurality of compute circuits is operable to execute a different instruction set than a second timestamp compute circuit.

* * * * *